(12) United States Patent
Van Horn et al.

(10) Patent No.: US 11,091,602 B2
(45) Date of Patent: *Aug. 17, 2021

(54) BLOWING AGENT COMPOSITIONS OF CARBON DIOXIDE AND HYDROCHLOROFLUOROOLEFINS

(71) Applicant: Arkema Inc., King of Prussia, PA (US)

(72) Inventors: Brett L. Van Horn, King of Prussia, PA (US); Benjamin Bin Chen, Wayne, PA (US); Philippe Bonnet, Lyons (FR)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/659,663

(22) Filed: Jul. 26, 2017

(65) Prior Publication Data

US 2017/0321027 A1 Nov. 9, 2017

Related U.S. Application Data

(60) Continuation-in-part of application No. 14/788,967, filed on Jul. 1, 2015, now abandoned, which is a division of application No. 14/243,048, filed on Apr. 2, 2014, now abandoned, which is a division of application No. 13/914,711, filed on Jun. 11, 2013, now Pat. No. 8,772,364, which is a continuation-in-part of application No. 12/532,238, (Continued)

(51) Int. Cl.
*C08J 9/14* (2006.01)
*C08J 9/08* (2006.01)
*C08J 9/12* (2006.01)

(52) U.S. Cl.
CPC .............. *C08J 9/144* (2013.01); *C08J 9/127* (2013.01); *C08J 9/142* (2013.01); *C08J 9/146* (2013.01); *C08J 9/149* (2013.01); *C08J 2203/12* (2013.01); *C08J 2203/162* (2013.01); *C08J 2203/182* (2013.01); *C08J 2203/202* (2013.01); *C08J 2325/06* (2013.01); *Y10T 428/249953* (2015.04)

(58) Field of Classification Search
CPC ... C08J 9/144; C08J 9/127; C08J 9/142; C08J 9/146; C08J 9/149; C08J 2203/12; C08J 2203/162; C08J 2325/06
See application file for complete search history.

(56) References Cited

U.S. PATENT DOCUMENTS 4,085,073 A 4/1978 Suh et al.
4,323,528 A 4/1982 Collins
(Continued)

FOREIGN PATENT DOCUMENTS

CA 2 016 328 11/1990
GB 950876 2/1964
(Continued)

*Primary Examiner* — Kara B Boyle
(74) *Attorney, Agent, or Firm* — Steven D. Boyd

(57) ABSTRACT

The present invention relates to blowing agent compositions of carbon dioxide and at least one hydrochlorofluoroolefin (HCFO). The HCFOs can include, but are not limited to, 1-chloro-3,3,3-trifluoropropene (HCFO-1233zd), 2-chloro-3,3,3-trifluoropropene (HCFO-1233xf) and mixtures thereof. The blowing agent compositions are useful in the production of low density insulating foams with improved k-factor made from thermoplastic resins. The blowing agent compositions may also optionally include one or more hydrofluoroolefins (HFOs).

8 Claims, 3 Drawing Sheets

Related U.S. Application Data filed as application No. PCT/US2008/058594 on Mar. 28, 2008, now abandoned.

(60) Provisional application No. 60/908,762, filed on Mar. 29, 2007.

(56) References Cited

U.S. PATENT DOCUMENTS

| | | |
|---|---|---|
| 6,300,378 B1 | 10/2001 | Tapscott et al. |
| 2004/0119047 A1 | 6/2004 | Singh et al. |
| 2004/0256594 A1 | 12/2004 | Singh et al. |
| 2006/0142173 A1 | 6/2006 | Johnson et al. |
| 2006/0243945 A1 | 11/2006 | Minor et al. |
| 2007/0010592 A1 | 1/2007 | Bowman et al. |
| 2010/0087555 A1 | 4/2010 | Vo et al. |

FOREIGN PATENT DOCUMENTS

| | | |
|---|---|---|
| WO | WO 2004/037913 A2 | 5/2004 |
| WO | WO 2005/105947 A2 | 11/2005 |
| WO | WO 2006/069362 A2 | 6/2006 |
| WO | WO 2007/002625 A2 | 1/2007 |
| WO | WO 2007/002703 A2 | 1/2007 |

US 11,091,602 B2

BLOWING AGENT COMPOSITIONS OF CARBON DIOXIDE AND HYDROCHLOROFLUOROOLEFINS

This application is a continuation-in-part of U.S. application Ser. No. 14/788,967 filed Jul. 1, 2015, which is a divisional of U.S. application Ser. No. 14/243,048 filed Apr. 2, 2014, which is a divisional of U.S. application Ser. No. 13/914,711 filed Jun. 11, 2013, which issued as U.S. Pat. No. 8,772,364 on Jul. 8, 2014, which is a continuation-in-part of U.S. application Ser. No. 12/532,238 filed Sep. 21, 2009, abandoned, which claimed priority to International application serial number PCT/US08/58594 filed Mar. 28, 2008 which application designated the United States and which claimed priority to U.S. provisional application Ser. No. 60/908,762 filed Mar. 29, 2007, all of which are incorporated herein by reference in their entirety for all purposes.

FIELD OF INVENTION

The invention pertains to thermoplastic foam products and blowing agent compositions useful for producing such products.

SUMMARY OF INVENTION

The present invention relates to blowing agent compositions comprising at least one hydrochlorofluoroolefin (HCFO) and at least one hydrofluoroolefin (HFO) used in the preparation of foamable thermoplastic compositions. The invention also relates to blends of at least one hydrochlorofluoroolefin (HCFO) with carbon dioxide, blends of at least one hydrofluoroolefin (HFO) with carbon dioxide, and blends of HCFO and HFO with carbon dioxide, each of which is useful in the preparation of foamable thermoplastic compositions.

The HCFOs may include, but are not limited to, 1-chloro-3,3,3-trifluoropropene (HCFO-1233zd), 2-chloro-3,3,3-trifluoropropene (HCFO-1233xf), dichloro-fluorinated propenes, and mixtures thereof. The HFOs may include, but are not limited to, 3,3,3-trifluoropropene (HFO-1243zf), 1,2,3,3,3-pentafluoropropene (HFO-1225ye), cis- and/or trans-1,3,3,3-tetrafluoropropene (HFO-1234ze), and 2,3,3,3-tetrafluoropropene (HFO 1234yf), and mixtures thereof. The blowing agent compositions are useful in the production of low density insulating foams with improved k-factor.

BACKGROUND OF INVENTION

With the continued concern over global climate change there is an increasing need to develop technologies to replace blowing agents with high ozone depletion potential (ODP) and high global warming potential (GWP). Though hydrofluorocarbons (HFC), being non-ozone depleting compounds, have been identified as alternative blowing agents to chlorofluorocarbons (CFCs) and hydrochlorofluorocarbons (HCFCs) in the production of thermoplastic foams, they still tend to have significant GWP.

Hydrofluoroolefins, such as HFO-1243zf, (cis/trans)-HFO-1234ze, HFO-1234yf, and (E/Z)-HFO-1225ye, have been identified as potential low GWP blowing agents for the production of thermoplastic foams, including extruded polystyrene foams for thermal insulation.

It was discovered that blowing agent compositions comprising at least one hydrofluorolefin with at least one hydrochlorofluoroolefin can permit the production of lower density, closed-cell foam with good k-factor which will be particularly useful for thermal insulating foams. This invention may also permit the production of low density, closed-cell foams with enlarged, controlled cell size.

WO 2004/037913, WO 2007/002703, and US Pat. Publication 2004119047 disclose blowing agents comprising halogenated alkenes of generic formula that would include numerous HFOs and HCFOs, among many other materials including brominated and iodinated compounds. The specific combination of HFOs with HCFOs in blowing agent compositions is not disclosed. Specific examples are shown for blowing agent compositions for foaming polystyrene comprising HFOs, specifically HFO-1234ze and HFO-1234yf, either alone or in combination with an HFC, and blowing agent compositions for PUR foaming comprising HCFO-1233zd. No examples of blowing agents combinations comprising HFOs and HCFOs are disclosed.

GB 950,876 discloses a process for the production of polyurethane foams. It discloses that any suitable halogenated saturated or unsaturated hydrocarbon having a boiling point below 150° C., preferably below 50° C., can be used as the blowing agent. Trichlorofluoroethene, chlorotrifluoroethene, and 1,1-dichloro-2,2-difluoroethene are disclosed in a list of suitable blowing agents along with 3,3,3-trifluoropropene. Hydrochlorofluoropropenes are not specifically disclosed nor are longer chain HCFOs nor other HFOs besides 3,3,3-trifluoropropene. There is no disclosure related to blowing agents for thermoplastic foaming, nor are the benefits of HCFOs in thermoplastic foaming mentioned, nor are the benefits of blowing agent combinations comprising HCFOs and HFOs.

CA 2016328 discloses a process for preparing closed-cell, polyisocyanate foam. Disclosed are organic compound blowing agents including halogenated alkanes and alkenes, where the alkene is propylene, and the halogenated hydrocarbons can be chlorofluorocarbons. Among the many exemplary compounds listed are specific chlorofluoroethylenes containing 1 chlorine and from 1 to 3 fluorines along with specific pentafluoropropene, tetrafluoropropene, and difluoropropene. Hydrochlorofluoropropenes are not specifically disclosed nor are longer chain HCFOs. There is no disclosure related to blowing agents for thermoplastic foaming, nor are the benefits of HCFOs in thermoplastic foaming mentioned, nor are the benefits of blowing agent combinations comprising HCFOs and HFOs.

DETAILED DESCRIPTION OF INVENTION

Figure 1:
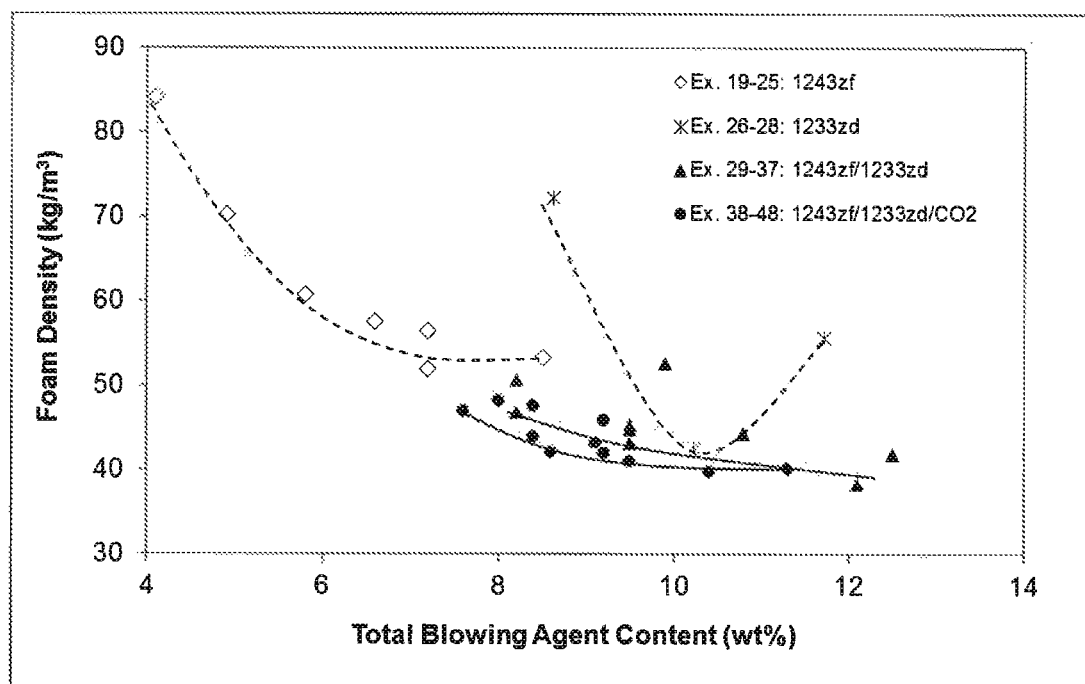
FIG. 1 is a graph of total blowing agent content versus foam density for examples 19-48.

The present invention relates to the use of blowing agents with negligible ozone-depletion and low GWP (global warming potential) comprising a blend of carbon dioxide with at least one hydrochlorofluoroolefin (HCFO) as a blowing agent for foamable thermoplastic resins. The invention also comprises carbon dioxide blended with an HCFO and optionally at least one hydrofluoroolefin (HFO) as a blowing agent for foamable thermoplastic resins. The invention also relates to the use of at least one hydrochlorofluoroolefin (HCFO) and optionally at least one hydrofluoroolefin (HFO) as a blowing agent for foamable thermoplastic resins.

The present invention discloses blowing agent and foamable resin compositions useful for the production of thermoplastic foams, which may be polystyrene, polyethylene, polypropylene, or mixtures thereof. These foams have decreased density and improved k-factor such that they are useful as insulating foams.

In a preferred embodiment of the invention, a blend of HCFO with carbon dioxide is used as a blowing agent for thermoplastic foamable resins. The HCFO is preferably (cis and/or trans)-1-chloro-3,3,3-trifluoropropene (HCFO-1233zd), particularly the trans isomer, 2-chloro-3,3,3-trifluoropropene (HCFO-1.233xf), 1,1-dicloro-3,3,3-trifluoropropene, 1,2-dichloro-3,3,3-trifluoropropene, or a mixture thereof. The preferred range of carbon dioxide combined with the HCFO is 1 mol % to 99 mol %. Optionally, a HFO may be combined with the blend of HCFO and carbon dioxide.

In another preferred embodiment of this invention the HFO is a C3 through C5 fluorinated alkene such as 3,3,3-trifluoropropene (HFO-1243zf); (cis and/or trans)-1,3,3,3-tetrafluoropropene (HFO-1234ze), particularly the trans isomer; 2,3,3,3-tetrafluoropropene (HFO-1234yf); (cis and/or trans)-1,2,3,3,3-pentafluoropropene (HFO-1225ye) and mixtures thereof. The HCFO is preferably (cis and/or trans)-1-chloro-3,3,3-trifluoropropene (HCFO-1233zd), particularly the trans isomer, 2-chloro-3,3,3-trifluoropropene (HCFO-1233xf), 1,1-dicloro-3,3,3-trifluoropropene, 1,2-dichloro-3,3,3-trifluoropropene, and mixtures thereof.

The blowing agent composition of the present invention may further comprise co-blowing agents such as hydrofluorocarbons, alkanes, carbon dioxide, methyl formate, inert gases, atmospheric gases, alcohols, ethers, fluorinated ethers, unsaturated fluorinated ethers, ketones, fluoroketones, water, and mixtures thereof. The hydrofluorocarbons may be selected from HFC-32, HFC-161, HFC-152, HFC-152a, HFC-143, HFC-143a, HFC-134a, HFC-125, HFC-245fa, HFC-365mfc, HFC-227ea, or mixtures thereof. The alkanes may be selected from propane, butane, pentane, such as n-pentane, cyclopentane, iso-pentane or mixtures thereof or hexane. The alcohols may be selected from ethanol, iso-propanol, butanol, ethyl hexanol, methanol, or mixtures thereof. The ethers may be selected from dimethyl ether, diethyl ether, methylethyl ether, or mixtures thereof. The ketones may be selected from acetone, methyl ethyl ketone, or mixtures thereof. In addition, the blowing agent composition of the present invention may further comprise additives such as dyes, pigments, cell-controlling agents, fillers, antioxidants, extrusion aids, stabilizing agents, antistatic agents, fire retardants, IR attenuating agents, thermally insulating additives, plasticizers, viscosity modifiers, impact modifiers, gas barrier resins, carbon black, surfactants, and mixtures thereof.

Another embodiment of this invention are foamable resin compositions containing greater than about 1 parts per hundred (pph) and less than about 100 pph of the blowing agent composition with respect to resin, preferably greater than about 2 pph and less than about 40 pph, more preferably greater than about 3 pph and less than about 25 pph, and even more preferably greater than about 4 pph and less than about 15 pph of the blowing agent composition with respect to resin.

Still another embodiment of the invention is a thermoplastic foam comprising a thermoplastic and a mixture of at most 99 mol % of one hydrochlorofluoroolefin (HCFO) and at least 1 mol % carbon dioxide. Preferred HCFOs are (cis and/or trans)-1-chloro-3,3,3-trifluoropropene (HCFO)-1233rd), particularly the trans isomer, 2-chloro-3,3,3-trifluoropropene (HCFO-1233xf), 1,1-dicloro-3,3,3-trifluoropropene, 1,2-dichloro-3,3,3-trifluoropropene, and mixtures thereof. The thermoplastic foam may also optionally include an HFO with the blend of HCFO and carbon dioxide.

Another embodiment of this invention is a thermoplastic foam comprising a blowing agent with negligible ozone-depletion and low GWP comprising at least one hydrofluoroolefin (HFO) and at least one hydrochlorofluoroolefin (HCFO).

The thermoplastic foams of the present invention exhibit a decreased density and improved k-factor and can be used as insulating foams. In a preferred embodiment of this invention the blowing agent can comprise an HFO component selected from 3,3,3-trifluoropropene (HFO-1243zf); (cis and/or trans)-1,3,3,3-tetrafluoropropene (HFO-1234ze), particularly the trans isomer; 2,3,3,3-tetrafluoropropene HFO-1234yf); (cis and/or trans)-1,2,3,3,3-pentafluoropropene (HFO-1225ye) and mixtures thereof. The HCFO component of the blowing agent can be selected from (cis and/or trans)-1-chloro-3,3,3-trifluoropropene (HCFO-1233zd), particularly the trans isomer, 2-chloro-3,3,3-trifluoropropene (HCFO-1233xf), 1,1-dicloro-3,3,3-trifluoropropene, 1,2-dichloro-3,3,3-trifluoropropene, and mixtures thereof.

In one embodiment of the present invention, the thermoplastic foam has a density below about 50 kg/m$^3$ at a blowing agent loading of from about 6 wt % to about 16 wt %, or at a blowing agent loading of from about 7 to about 13 wt. Preferably the foam density is between about 24 and 50 kg/m$^3$ or between about 30 and 50 kg/m$^3$ or between about 38 kg/m$^3$ and about 50 kg/m$^3$ at a blowing agent loading of from about 6 to about 16 wt %, or at a blowing agent loading of from about 7 wt % to about 13 wt %. In another embodiment of this invention, the thermoplastic foam has a density of less than about 70 kg/m$^3$, preferably from about 24 kg/m$^3$ to about 50 kg/m$^3$ and most preferably from about 38 kg/m$^3$ to about 50 kg/m$^3$. In another embodiment of this invention, the thermoplastic foam is a closed-cell foam, preferably with an open-cell content of less than about 20%, more preferably less than about 10%. In another embodiment of this invention, the thermoplastic foam has a fine cell structure, preferably with an average cell size of from about 0.05 mm to about 1.0 mm, more preferably from about 0.05 mm to about 0.5 mm.

In one embodiment of the invention, carbon dioxide comprises 1 mol % to 99 mol % of the blowing agent and the HCFO comprises 99% mol % to 1 mol % of the blowing agent. In another embodiment of this invention carbon dioxide comprises 2 mol % to 50 mol % of the blowing agent and the HCFO comprises 98 mol % to 50 mol % of the blowing agent. In another embodiment of this invention carbon dioxide comprises 5 mol % to 45 mol % of the blowing agent and the HCFO comprises 95 mol % to 55 mol % of the blowing agent.

In another embodiment of the invention, carbon dioxide comprises 1 weight % to 99 weight % of the blowing agent and the HCFO comprises 99 weight % to 1 weight % of the blowing agent. In another embodiment of this invention, carbon dioxide comprises 1 weight % to 50 weight % of the blowing agent and the HCFO comprises 99 weight % to 50 weight % of the blowing agent. In another embodiment of this invention, carbon dioxide comprises 1 weight %) to 45 weight % of the blowing agent and the HCFO comprises 99 weight % to 55 weight % of the blowing agent. In another embodiment of this invention, carbon dioxide comprises 1 weight % to 25 weight % of the blowing agent and the HCFO comprises 99 weight % to 75 weight % of the blowing agent.

In another embodiment of the invention, carbon dioxide comprises 1 mol % to 99 mol % of the blowing agent and the HCFO or HFO comprises from 99 mol % to 1 mol % of the blowing agent. In another embodiment of this invention, carbon dioxide comprises 2 mol % to 50 mol % of the blowing agent and the HCFO or HFO comprises from 98 mol % to 50 mol % of the blowing agent. In another embodiment of this invention, carbon dioxide comprises 5 mol % to 45 mol % of the blowing agent and the HCFO or HFO comprises from 95 mol % to 55 mol % of the blowing agent.

In another embodiment of the invention, carbon dioxide comprises 1 weight % to 99 weight % of the blowing agent and the HCFO or FIFO comprises 99 weight % to 1 weight % of the blowing agent. In another embodiment of this invention, carbon dioxide comprises 1 weight % to 50 weight % of the blowing agent and the HCFO or HFO comprises 99 weight % to 50 weight % of the blowing agent. In another embodiment of this invention, carbon dioxide comprises 1 weight % to 45 weight % of the blowing agent and the HCFO or HFO comprises 99 weight % to 55 weight % of the blowing agent. In another embodiment of this invention, carbon dioxide comprises 1 weight % to 25 weight % of the blowing agent and the HCFO or HFO comprises 99 weight % to 75 weight % of the blowing agent.

In another embodiment of the invention, carbon dioxide comprises 1 mol % to 99 mol % of the blowing agent and the HCFO and HFO comprise from 99 mol % to 1 mol % of the blowing agent. In another embodiment of this invention, carbon dioxide comprises 2 mol % to 50 mol % of the blowing agent and the HCFO and HFO comprise from 98 mol % to 50 mol % of the blowing agent. In another embodiment of this invention, carbon dioxide comprises 5 mol % to 45 mol % of the blowing agent and the HCFO and HFO comprises from 95 mol % to 55 mol % of the blowing agent.

In another embodiment of the invention, carbon dioxide comprises 1 weight % to 99 weight % of the blowing agent and the HCFO and HFO comprise 99 weight % to 1 weight % of the blowing agent. In another embodiment of this invention, carbon dioxide comprises 1 weight % to 50 weight % of the blowing agent and the HCFO and HFO comprise 99 weight % to 50 weight % of the blowing agent. In another embodiment of this invention, carbon dioxide comprises 1 weight % to 45 weight % of the blowing agent and the HCFO and HFO comprise 99 weight % to 55 weight % of the blowing agent. In another embodiment of this invention, carbon dioxide comprises 1 weight % to 25 weight % of the blowing agent and the HCFO and HFO comprise 99 weight % to 75 weight % of the blowing agent.

In another embodiment of this invention, the blowing agent comprises from about 1 to about 99 wt % of the HCFO component, preferably from about 2 to about 90 wt % of the HCFOcomponent. In an embodiment of this invention, the blowing agent comprises more than about 10 wt % of the HCFO component. In an embodiment of this invention, the blowing agent comprises more than about 20 wt % of the HCFO component. In an embodiment of this invention, the blowing agent comprises more than about 30 wt % of the HCFO component. In an embodiment of this invention, the blowing agent comprises less than about 70 wt % of the HCFO component. In embodiment of this invention, the blowing agent comprises less than about 65 wt % of the HCFO component. In embodiment of this invention, the blowing agent comprises less than about 60 wt % of the HCFO component. In an embodiment of this invention, the blowing agent comprises less than about 50 wt % of the HCFO component. In another embodiment of the invention, the blowing agent comprises more than about 20 wt % of the HFO component. In another embodiment of this invention, the blowing agent comprises more than about 30 wt % of the HFO component. In another embodiment of this invention, the blowing agent comprises more than about 40 wt % of the HFO component. In another embodiment of this invention, the blowing agent comprises more than about 50 wt % of the HFO component. In another embodiment of this invention, the blowing agent comprises more than about 60 wt % of the HFO component. In another embodiment of this invention, the blowing agent comprises more than about 70 wt % of the HFO component. In another embodiment of this invention, the blowing agent comprises more than about 90 wt % of the HFO component. In another embodiment of this invention, the blowing agent comprises from about 50 wt % to about 98 wt % of the HFO component.

The process for preparing a foamed thermoplastic product, which may be polystyrene, polyethylene, polypropylene, or mixtures thereof, is as follows:

Prepare a foamable polymer composition by blending together components comprising foamable polymer composition in any order. Typically, a foamable polymer composition is prepared by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin near or above its glass transition temperature (Tg), or melt temperature (Tm) for crystalline polymers.

A foamable polymer composition can contain additional additives such as nucleating agents, cell-controlling agents, dyes, pigments, fillers, antioxidants, extrusion aids, stabilizing agents, antistatic agents, fire retardants, IR attenuating agents and thermally insulating additives. Nucleating agents include, among others, materials such as talc, calcium carbonate, sodium benzoate, and chemical blowing agents such azodicarbonamide or sodium bicarbonate and citric acid. IR attenuating agents and thermally insulating additives can include carbon black, graphite, silicon dioxide, metal flake or powder, among others. Flame retardants can include, among others, brominated materials such as hexabromocyclodecane and polybrominated biphenyl ether.

Foam preparation processes of the present invention include batch, semi-batch, and continuous processes. Batch processes involve preparation of at least one portion of the foamable polymer composition in a storable state and then using that portion of foamable polymer composition at some future point in time to prepare a foam.

A semi-batch process involves preparing at least a portion of a foamable polymer composition and intermittently expanding that foamable polymer composition into a foam all in a single process. For example, U.S. Pat. No. 4,323,528, herein incorporated by reference, discloses a process for making polyolefin foams via an accumulating extrusion process. The process comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone has a die defining an orifice opening into a zone of lower pressure at which the foamable polymer composition foams and an operable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam.

A continuous process involves forming a foamable polymer composition and then expanding that foamable polymer composition in a non-stop manner. For example, a foamable polymer composition may be prepared in an extruder by heating a polymer resin to form a molten resin, blending into the molten resin a blowing agent composition at an initial pressure to form a foamable polymer composition, and then extruding that foamable polymer composition through a die into a zone at a foaming pressure and allowing the foamable polymer composition to expand into a foam. Desirably, cool the foamable polymer composition after addition of the blowing agent and prior to extruding through the die in order to optimize foam properties. Cool the foamable polymer composition, for example, with heat exchangers.

Foams of the present invention can be of any form imaginable including sheet, plank, rod, tube, beads, or any combination thereof. Included in the present invention are laminate foams that comprise multiple distinguishable longitudinal foam members that are bound to one another.

EXAMPLES

Examples 1-8

Solubility and Diffusivity of Gases in Polystyrene

The solubility and diffusivity of gases in polystyrene resin was measured using capillary column inverse gas chromatography (cc-IGC) as described in: Hadj Romdhane, Ilyess (1994) "Polymer-Solvent Diffusion and Equilibrium Parameters by Inverse Gas-Liquid Chromatography" PhD Dissertation, Dept. of Chem. Eng., Penn State University. and Hong SU, Albouy A, Duda JL (1999) "Measurement and Prediction of Blowing Agent Solubility in Polystyrene at Supercritical Conditions" Cell Polym 18(5): 301-313.

A 15 m long, 0.53 mm diameter GC capillary-column was prepared with a 3 micron thick polystyrene internal film coating. The column was installed into a Hewlet Packard 5890 Series II Gas Chromatograph with flame ionizer detector. Elution profiles for gases being tested were analyzed according the method outlined in the reference, using methane as the reference gas. The results give the diffusion coefficient of the gas through the polymer, Dp, and the solubility of the gas in the polymer in terms of the partition coefficient, K, which is the ratio of the concentration of the gas in the polymer phase to the concentration in the vapor phase. As such, the greater the value of K for a particular gas in the resin, the greater its solubility in that resin.

Table 1 shows the partition coefficient and diffusivity values for several gases in polystyrene at 140° C. Comparative examples 1 and 2 show the solubility and diffusivity of two well studied blowing agents in polystyrene: HCFC-142b (1-chloro-1,1-difluoroethane) and HFC-134a (1,1,1,2-tetrafluoroethane). Examples 3-6 show the solubility and diffusivity of selected HFOs in polystyrene: HFO-1243zf (3,3,3-trifluoropropene), HFO-1234ze (1,3,3,3-tetrafluoropropene), HFO-1234yf (2,3,3,3-tetrafluoropropene), HFO-1225ye (1,2,3,3,3-pentafluoropropene). Examples 7 and 8 show the solubility and diffusivity of trans-HCFO-1233zd (1-chloro-3,3,3-trifluoropropene) and HCFO-1233xf (2-chloro-3,3,3-trifluoropropene), The good solubility and favorable diffusivity of the HCFOs in polystyrene indicate that they should be effective coblowing agents and/or processing aids for the production of thermoplastic foams using HFO blowing agents. The solubility of the HCFOs in polystyrene is sufficient to provide useful plasticization of the thermoplastic resin to assist in foaming. As can be seen, HCFO-1233xf has a solubility in polystyrene comparable to that of HCFC-142b.

TABLE 1

Partition Coefficient and Diffusivity of Gases in Polystyrene at 140° C. by Inverse Gas Chromatography

| Example | Gas | Bp (° C.) | Mw (g/mol) | K | Dp (cm$^2$/s) |
|---|---|---|---|---|---|
| 1 | HCFC-142b | −9.8 | 100.49 | 1.249 | 2.61E−08 |
| 2 | HFC-134a | −26.1 | 102.02 | 0.397 | 3.40E−08 |
| 3 | HFO-1243zf | −22 | 96.05 | 0.544 | 2.95E−08 |
| 4 | HFO-1234ze | −16 | 114.04 | 0.423 | 3.09E−08 |
| 5 | HFO-1225ye | −18 | 132.03 | 0.312 | 2.44E−08 |
| 6 | HFO-1234yf | −28.5 | 114.04 | 0.275 | >2E−08 |
| 7 | HCFO-1233zd | 20.5 | 130.5 | 2.326 | 1.72E−08 |
| 8 | HCFO-1233xf | 15 | 130.5 | 1.475 | 1.67E−08 |

Examples 9-18

Extruded polystyrene foam was produced using a counter-rotating twin screw extruder with internal barrel diameters of 27 mm and a barrel length of 40 diameters. The screw design was suitable for foaming applications. The pressure in the extruder barrel was controlled with the gear pump and was set high enough such that the blowing agent dissolved into the molten polymer in the extruder. The extruder die for examples 10-18 was an adjustable-lip slot die with a gap width of 6.35 mm. For example 9, the die was a 2 mm diameter strand die with a 1 mm land length. Two grades of general purpose polystyrene were used for the extrusion trials and fed to the extruder at rates of either 2.27 or 4.54 kg/hr (5 or 10 lb/hr). Blowing agents were pumped into the polystyrene resin melt at a controlled rate using high pressure delivery pumps. In the extruder, the blowing agent is mixed and dissolved in the resin melt to produce an expandable resin composition. The expandable resin composition is cooled to an appropriate foaming temperature and then extruded from the die where the drop in pressure initiates foaming. Talc was used as a nucleating agent and was pre-blended with polystyrene to make a masterbatch of 50 wt % talc in polystyrene. Beads of this masterbatch were mixed with polystyrene pellets to achieve 0.5 wt % talc in each experiment.

The density, open cell content, and cell size were measured for foam samples collected during each run. Density was measured according to ASTM D792, open cell content was measured using gas pycnometry according to ASTM D285-C, and cell size was measured by averaging the cell diameters from scanning electron microscope (SEM) micrographs of foam sample fracture surfaces. SEM images are also used to observe the cell structure and qualitatively check for open cell content.

Table 2 shows data for examples 9 through 14, including the loading of each blowing agent in the formulation, the resin feed rate, melt flow index of the resin, the expandable resin melt temperature, and the density, cell size, and open cell content of the resulting foamed product.

Comparative example 9 is typical for polystyrene foaming with HFC-134a, where the poor solubility and difficulties in processing tend to lead to higher density foam with smaller size and more open cells.

Comparative examples 10 through 12 show results for foaming with 3,3,3-trifluoropene (HFO-1243zf; TFP) alone. At the highest loading of 8.5 wt % TFP the resulting foam had smaller cell size while still achieving comparative density to examples 10 and 11.

In examples 13 and 14, blowing agent compositions of TFP (HFO-1243A) blended with HCFO-1233zd permitted production of lower density foam than achievable with TFP alone along with a beneficial enlargement in the cell size, where it was possible to produce closed-cell foam product with cell sizes greater than 0.2 mm at densities less than 53 kg/m$^3$. These foams would be useful as thermal insulating foams with improved k-factor. The HCFO-1233zd was predominantly the trans-isomer.

Examples 15 and 16 were produced using HFO-1234yf (2,3,3,3-tetrafluoroethane) as the only blowing agent. At a loading of 5.7 wt % 1234yf, as shown in example 16, the foamed product had very small cell size, macrovoids, blowholes, high open cell content, and frequent periods of popping at the die caused by undissolved blowing agent. Increasing the content of 1234 yf made these problems worse. For examples 17 and 18, blowing agent compositions of both HFO-1234yf and HCFO-1.233zd permitted production of lower density foam than was produced using the HFO-1234yf alone. The foamed samples of examples 17 and 18 were of good quality, with few defects and produced without popping at the die.

The density, open cell content, and cell size were measured for foam samples collected during each run. Open cell content was measured using gas pycnometry according to ASTM D285-C, and cell size was measured by averaging the cell diameters from scanning electron microscope (SEM) micrographs of foam sample fracture surfaces. SEM images were also used to observe the cell structure and qualitatively check for open cell content.

Examples 19 to 25 were produced using HFO-1243zf as the only blowing agent at loadings ranging from 4.1 to 8.5 wt %. Examples 22 and 23 are duplicates of examples 10 and 11 above. Example 25 is similar to example 12 above but performed at a higher temperature. Both were produced with 8.5 wt % HFO-1243zf, but example 25 was found to be of better quality (fewer defects, lower density). The melt temperature in example 25 was 125° C. while the melt temperature in example 12 was 117° C. The results are shown in Table 3 and plotted in FIG. 1.

Examples 26 to 28 were produced using trans-HCFO-1233zd as the only blowing agent at loadings ranging from 8.6 to 11.7 wt %. The results are shown in Table 3 and plotted in FIG. 1.

Examples 29 to 37 were produced using blowing agent combinations of from 38 wt % to 66 wt % HFO-1243zf and from 62 wt % to 34 wt % trans-HCFO-1233zd as the blowing agents, respectively. The total loading of blowing agent ranged from 8.2 to 12.5 wt %. Examples 33 and 34 are duplicates of examples 13 and 14 above. The results are shown in Table 3 and plotted in FIG. 1.

Examples 38 to 48 were produced using blowing agent combinations of from 33 wt % to 53 wt % HFO-1243zf, 28

TABLE 2

| | Blowing Agent Loading | | | | Polystyrene Resin | | | Foam Properties | | |
|---|---|---|---|---|---|---|---|---|---|---|
| Example | 134a (wt %) | TFP (wt %) | 1234yf (wt %) | 1233zd (wt %) | Feed (kg/hr) | MFI (g/10 min) | $T_{melt}$ (° C.) | Density (kg/m$^3$) | Cell Size (mm) | OCC (%) |
| 9  | 6.4 | —   | —   | —   | 2.27 | 4.0  | 111 | 60.9 | 0.06 | 23 |
| 10 | —   | 6.6 | —   | —   | 2.27 | 11.0 | 114 | 57.6 | 0.11 | <5 |
| 11 | —   | 7.2 | —   | —   | 2.27 | 11.0 | 115 | 56.5 | 0.11 | <5 |
| 12 | —   | 8.5 | —   | —   | 4.54 | 4.0  | 117 | 58.0 | 0.05 | <5 |
| 13 | —   | 4.1 | —   | 6.6 | 4.54 | 11.0 | 113 | 44.3 | 0.29 | <5 |
| 14 | —   | 6.5 | —   | 3.4 | 4.54 | 11.0 | 113 | 52.5 | 0.35 | <5 |
| 15 | —   | —   | 4.4 | —   | 4.54 | 11.0 | 117 | 90.9 | 0.15 | 5 |
| 16 | —   | —   | 5.7 | —   | 4.54 | 11.0 | 115 | 71.6 | 0.06 | 31.4 |
| 17 | —   | —   | 4.2 | 4.3 | 4.54 | 11.0 | 114 | 55.2 | 0.12 | <5 |
| 18 | —   | —   | 4.8 | 5.0 | 4.54 | 11.0 | 113 | 53.5 | 0.08 | <5 |

Examples 19-48

Extruded polystyrene foam was produced using a counter-rotating twin screw extruder with internal barrel diameters or 27 mm and a barrel length of 40 diameters. The screw design was suitable for foaming applications. The pressure in the extruder barrel was controlled with a gear pump and was set high enough such that the blowing agent dissolved in the extruder. The extruder die was an adjustable-lip slot die with a gap width of 6.35 mm. Two grades of general purpose polystyrene was used for the extrusion experiments and fed to the extruder at an overall rate of 4.54 kg/hr (10 lb/hr). Blowing agents were pumped into the polystyrene resin melt at a controlled rate using high pressure delivery pumps. In the extruder, the blowing agent mixed with and dissolved in the resin melt to produce an expandable resin composition. The expandable resin composition was cooled to an appropriate foaming temperature and then extruded from the die where the drop in pressure initiates foaming. Talc was used as a nucleating agent at 0.5 wt % talc in polystyrene.

wt % to 52 wt % trans-HCFO-1233zd, and from 13 wt % to 20 wt % carbon dioxide ($CO_2$). The total blowing agent loading ranged from 7.6 to 11.3 wt %. The results are shown in. Table 3 and plotted in FIG. 1.

The blowing agent formulations for examples 19 to 48 are shown in Table 3 along with the foam density. With the exception of Example 28, all foams shown in Table 3 had an open cell content<10%. Example 28, blown using 11.7 wt % trans-HCFO-1233zd, had an open cell content ~13%. With the exception of Example 48, all foams shown in Table 3 had a cell size 0.1 mm.

FIG. 1 shows a plot of total blowing agent content versus foam density for examples 19 to 48. As mentioned above, the data are divided into four series:
1) Examples 19 to 25 (open diamonds) for HFO-1243zf;
2) Examples 26 to 28 (asterisks) for trans-HCFO-1233zd;
3) Examples 29 to 37 (filled triangles) for combinations of HFO-1243zf and trans-HCFO-1233zd (1243zf/1233zd); and
4) Examples 38 to 48 (filled circles) for combinations of HFO-1243zf, trans-HCFO-1233zd and carbon dioxide (1243zf/1233zd/($CO2$).

Trend lines for each series show the minimum density achieved for each blowing agent combination. The data shows that using the blowing agent combinations of 1243zf/1233zd or 1.243zf/1233zd/$CO_2$ permit production of low density foam over a wider range of blowing agent loadings than either 1243zf or 1233zd alone. For example, examples 25 and 26 are blown with approximately 8.5 wt % 1243zf and 8.5 wt % 1233zd, respectively. Examples 29-30 and 40-42, blown with 1243zf/1.233zd and 1243zf/1233zd/$CO_2$ respectively, are of significantly lower density but blown using about the same amount of blowing agent or less. Also, the foam of example 25 had a cell size<0.1 mm whereas all foams of Examples 29-30 and 38-42 had cell sizes of from 0.1-0.3 mm. As shown in examples 36 and 47, blown with blends of 1243zf/1233zd and 1243zf/1233zd/$CO_2$ respectively, it was possible to produce closed-cell foam with cell sizes>0.1 mm with density less than 40 kg/m$^3$.

leaks. The vessel was then evacuated to remove air before blowing agents were added. Approximately 0.245 total moles of blowing agents were used for each experiment. Various molar ratios of trans-1233zd and carbon dioxide were tested. These are shown in Table 4 for each Example 49-59. Table 5 shows the weight percent of each gas in the blowing agent compositions for each of the Examples 49-59.

TABLE 3

| Example | Blowing Agent Composition | | | Blowing Agent Loading | | | Total Blowing Agent Loading (wt %) | Density (kg/m$^3$) |
|---|---|---|---|---|---|---|---|---|
| | 1243zf (wt %) | 1233zd (wt %) | CO2 (wt %) | 1243zf (wt %) | 1233zd (wt %) | CO2 (wt %) | | |
| 19 | 100% | — | — | 4.1 | — | — | 4.1 | 84.1 |
| 20 | 100% | — | — | 4.9 | — | — | 4.9 | 70.2 |
| 21 | 100% | — | — | 5.8 | — | — | 5.8 | 60.7 |
| 22 | 100% | — | — | 6.6 | — | — | 6.6 | 57.6 |
| 23 | 100% | — | — | 7.2 | — | — | 7.2 | 56.5 |
| 24 | 100% | — | — | 7.2 | — | — | 7.2 | 51.9 |
| 25 | 100% | — | — | 8.5 | — | — | 8.5 | 53.3 |
| 26 | — | 100% | — | — | 8.6 | — | 8.6 | 72.2 |
| 27 | — | 100% | — | — | 10.2 | — | 10.2 | 42.4 |
| 28 | — | 100% | — | — | 11.7 | — | 11.7 | 55.5 |
| 29 | 65% | 35% | — | 5.3 | 2.9 | — | 8.2 | 46.8 |
| 30 | 65% | 35% | — | 5.3 | 2.9 | — | 8.2 | 50.6 |
| 31 | 49% | 51% | — | 4.6 | 4.9 | — | 9.5 | 45.2 |
| 32 | 49% | 51% | — | 4.6 | 4.9 | — | 9.5 | 43.2 |
| 33 | 49% | 51% | — | 4.6 | 4.9 | — | 9.5 | 44.7 |
| 34 | 66% | 34% | — | 6.5 | 3.4 | — | 9.9 | 52.5 |
| 35 | 38% | 62% | — | 4.1 | 6.6 | — | 10.7 | 44.3 |
| 36 | 45% | 55% | — | 5.5 | 6.2 | — | 12.1 | 38.3 |
| 37 | 38% | 62% | — | 4.8 | 7.7 | — | 12.5 | 41.8 |
| 38 | 52% | 28% | 20% | 4.0 | 2.1 | 1.5 | 7.6 | 46.9 |
| 39 | 53% | 29% | 19% | 4.2 | 2.3 | 1.5 | 8.0 | 48.1 |
| 40 | 53% | 29% | 18% | 4.5 | 2.4 | 1.5 | 8.4 | 47.6 |
| 41 | 53% | 29% | 18% | 4.5 | 2.4 | 1.5 | 8.4 | 42.9 |
| 42 | 33% | 49% | 17% | 2.9 | 4.2 | 1.5 | 8.6 | 42.1 |
| 43 | 34% | 50% | 16% | 3.0 | 4.5 | 1.5 | 9.1 | 43.2 |
| 44 | 43% | 41% | 16% | 3.9 | 3.8 | 1.5 | 9.2 | 45.8 |
| 45 | 43% | 41% | 17% | 3.9 | 3.8 | 1.5 | 9.2 | 41.9 |
| 46 | 34% | 50% | 16% | 3.2 | 4.8 | 1.5 | 9.5 | 41.0 |
| 47 | 34% | 51% | 15% | 3.6 | 5.3 | 1.5 | 10.4 | 39.8 |
| 48 | 35% | 52% | 13% | 3.9 | 5.9 | 1.5 | 11.3 | 40.1 |

Examples 49-59

Batch foaming experiments were conducted on polystyrene resins to demonstrate both the effect of foaming temperature and the effect of adding carbon dioxide to trans-1233zd (1-chloro-3,3,3-trifluoro propene) on the density of the foam produced.

The foaming experiments were carried out in a 300 ml Parr stainless steel autoclave equipped with a pressure gauge, a thermocouple, and a rupture disk. The thermocouple was positioned so that it measured the temperature of resin or foam.

For each experiment, approximately 6 grams of polystyrene was weighed out, ground, then degassed at 50° C. The ground, degassed polystyrene sample was then loaded into a PTFE cup and inserted into the autoclave vessel. The vessel was then closed, sealed and pressure tested using nitrogen under ~700 psig in order to eliminate any potential

TABLE 4

Blowing Agent Blends of trans-HCFO-1233zd and $CO_2$

| Example | trans-1233zd mol % | $CO_2$ mol % |
|---|---|---|
| 49 | 100.0 | 0.0 |
| 50 | 95.0 | 5.0 |

TABLE 4-continued

Blowing Agent Blends of trans-HCFO-1233zd and $CO_2$

| Example | trans-1233zd mol % | $CO_2$ mol % |
|---|---|---|
| 51 | 90.0 | 10.0 |
| 52 | 85.0 | 15.0 |
| 53 | 80.0 | 20.0 |
| 54 | 75.0 | 25.0 |
| 55 | 70.0 | 30.0 |
| 56 | 60.0 | 40.0 |
| 57 | 50.0 | 50.0 |
| 58 | 10.0 | 90.0 |
| 59 | 0.0 | 100.0 |

TABLE 5

Blowing agent blends of trans-1233-zd and $CO_2$ in weight percent of total gas

| Example | trans-1233zd | $CO_2$ |
|---|---|---|
| | Weight percent of total blowing agent | |
| 49 | 100.0 | 0.0 |
| 50 | 98.3 | 1.7 |
| 51 | 96.4 | 3.6 |
| 52 | 94.4 | 5.6 |
| 53 | 92.2 | 7.8 |
| 54 | 89.9 | 10.1 |
| 55 | 87.4 | 12.6 |
| 56 | 81.6 | 18.4 |
| 57 | 74.8 | 25.2 |
| 58 | 24.8 | 75.2 |
| 59 | 0.0 | 100.0 |

The autoclave was then heated to a controlled temperature between 105 and 135° C. and the pressure was elevated. The temperature and pressure were maintained for approximately 24 hours. To initiate foaming, the autoclave was rapidly degassed by opening a vent port; the autoclave was then opened and the foam sample was removed and measured for density.

Figure 2:
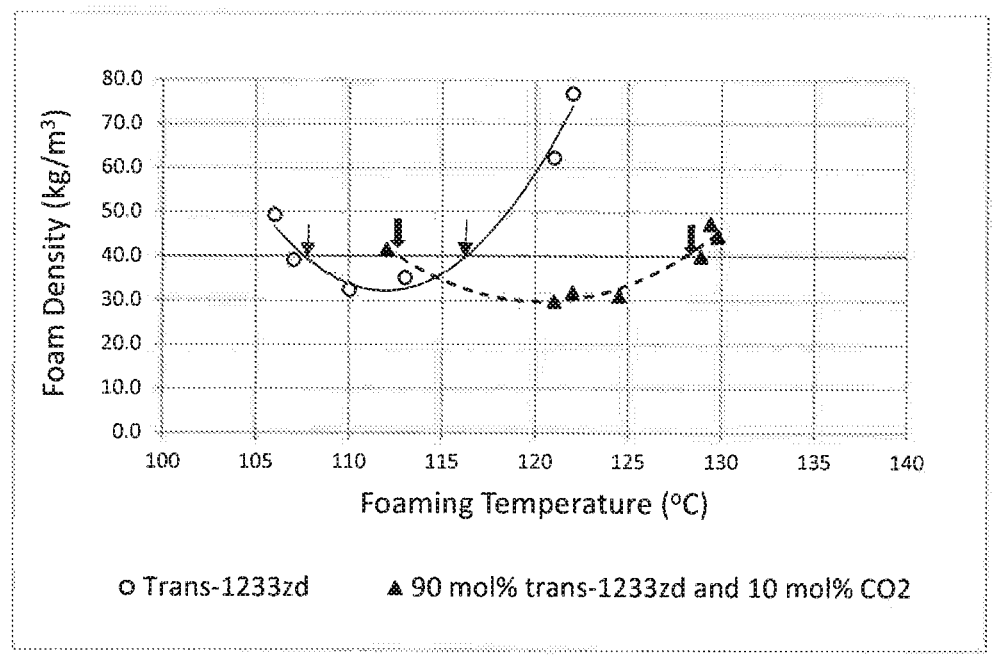
FIG. 2 shows the effect of foaming temperature on foam density or an embodiment of the invention.

Foaming temperature is a key parameter during the foaming process of polystyrene. As shown in FIG. 2, the foam density changed significantly as the foaming temperature varied between 105° C. and 135° C.

FIG. 2 shows that when carbon dioxide was mixed with trans-1233zd, in order to achieve similar or lower or better density, foaming temperature needed to increase by approximately 10° C. Additionally, as shown by the arrows, to achieve similar foam density, the foaming temperature range or window was approximately doubled when carbon dioxide was added as compared to trans-1233zd alone. For trans-1233zd alone, a fairly constant foam density of about 40 kg/m³ was achieved from about 108° C. to 116° C., a range of 8° C. In contrast, adding just 10 mol % $CO_2$ (corresponding to just 3.6 weight percent of $CO_2$) to the trans-1233zd widened the temperature range over which foam having 40 kg/m³ density could be produced to about 17° C. (112° C. to 129° C.)

Figure 3:
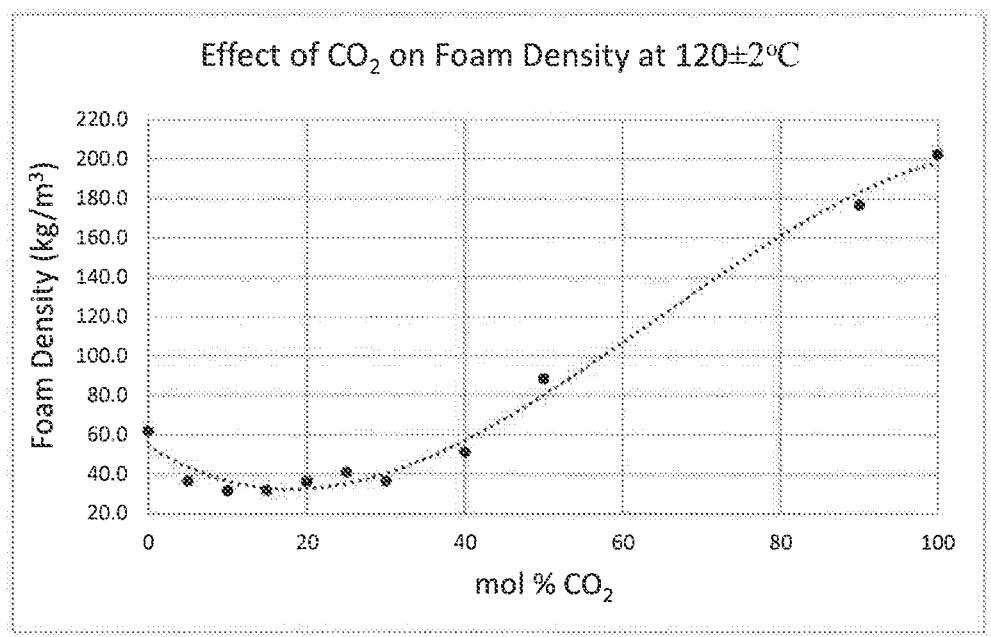
FIG. 3 shows the effect of the relative amounts of carbon dioxide and an HCFO on foam density.

FIG. 3 demonstrates the impact of the relative amount of carbon dioxide in the blowing agent blend on foam density. For this series of experiments, the foaming temperature was kept constant at approximately 120° C., while the molar ratio of $CO_2$ to the trans-123zd was varied. The total amount of $CO_2$ and trans-1233zd was kept constant at 0.245 mol. The results are plotted in FIG. 3.

FIG. 3 shows first, that the addition of only 5 mol % $CO_2$ (just under 2% by weight) to the trans-1233zd lowered the foam density significantly, from about 60 kg/m³ for trans-1233zd alone to about 40 kg/m³ when the $CO_2$ was added. Further, adding a higher proportion of $CO_2$ to the trans-1233zd did not change the foam density until approximately 43 mol % had been added, which corresponds to approximately 20% $CO_2$ by weight. This result demonstrates that adding a small amount of $CO_2$ can widen the operating window significantly when producing foam of controlled density. Both the foaming gas composition and the processing temperature can vary, while still producing good quality foam at a controlled density.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

What is claimed is:

1. A polystyrene foam product comprising polystyrene and a blowing agent composition, wherein the blowing agent composition consists of carbon dioxide and the hydrochlorofluoroolefin trans-1-chloro-3,3,3-trifluoropropene and optional co-blowing agents selected from the group consisting of hydrofluorocarbons, alkanes, methyl formate, inert gases, atmospheric gases, alcohols, ethers, fluorinated ethers, unsaturated fluorinated ethers, ketones, fluoroketones, water, and mixtures thereof and optional additives wherein the polystyrene foam product is formed at a temperature of from 112° to 129° C., has a density of from about 30 to about 40 kg/m³ and said carbon dioxide comprises about 10 mole percent of the hydrochlorofluoroolefin trans-1-chloro-3,3,3-trifluoropropene and carbon dioxide combination.

2. The polystyrene foam product according to claim 1 wherein the hydrofluorocarbon is selected from the group consisting of HFC-32, HFC-161, HFC-152, HFC-152a, HFC-143, HFC-143a, HFC-134, HFC-134a, HFC-125, HFC-245fa, HFC-365mfc, HFC-227ea, and mixtures thereof.

3. The polystyrene foam product according to claim 1 wherein the alkane is selected from the group consisting of propane, butanes, pentanes, and hexanes.

4. The polystyrene foam product according to claim 3 wherein the pentane is selected from the group consisting of n-pentane, cyclopentane, iso-pentane, and mixtures thereof.

5. The polystyrene foam product according to claim 1 wherein the alcohol is selected from the group consisting of ethanol, iso-propanol, butanol, ethyl hexanol, methanol, and mixtures thereof.

6. The polystyrene foam product according to claim 1 wherein the ether is selected from the group consisting of dimethyl ether, diethyl ether, methylethyl ether, and mixtures thereof.

7. The polystyrene foam product according to claim 1 wherein the ketone is selected from the group consisting of acetone, methyl ethyl ketone, and mixtures thereof.

8. The polystyrene foam product according to claim 1, wherein the additive is selected from the group consisting of dyes, pigments, cell-controlling agents, fillers, antioxidants, extrusion aids, nucleating agents, stabilizing agents, antistatic agents, fire retardants, IR attenuating agents, thermally insulating additives, plasticizers, viscosity modifiers, impact modifiers, gas barrier resins, carbon black, surfactants, chemical blowing agents, and mixtures thereof.

* * * * *